(12) United States Patent
DeMarco et al.

(10) Patent No.: US 7,797,081 B2
(45) Date of Patent: Sep. 14, 2010

(54) FEEDBACK ACCELERATION REDUCTION FOR FLUID SUPPLY VALVES

(75) Inventors: Frank A DeMarco, East Peoria, IL (US); Hongliu Du, Dunlap, IL (US); Brian D Kuras, Metamora, IL (US); Thomas M Sopko, East Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 370 days.

(21) Appl. No.: 11/770,375

(22) Filed: Jun. 28, 2007

(65) Prior Publication Data

US 2009/0005914 A1    Jan. 1, 2009

(51) Int. Cl.
G05D 7/06 (2006.01)
G05D 16/00 (2006.01)

(52) U.S. Cl. .......................... 700/282; 700/301; 60/445
(58) Field of Classification Search ................. 700/282, 700/301; 60/445; 477/38, 43, 45
See application file for complete search history.

(56) References Cited

U.S. PATENT DOCUMENTS

| | | | |
|---|---|---|---|
| 5,295,415 A | 3/1994 | Abe et al. | |
| 5,938,711 A | 8/1999 | Steeby et al. | |
| 6,038,504 A | 3/2000 | Cronin et al. | |
| 6,123,644 A | 9/2000 | Janecke et al. | |
| 6,146,308 A | 11/2000 | Taniguchi et al. | |
| 6,385,970 B1 | 5/2002 | Kuras et al. | |
| 6,424,902 B1 | 7/2002 | Kuras | |
| 6,662,705 B2 | 12/2003 | Huang et al. | |
| 2007/0142163 A1* | 6/2007 | Murray | 476/42 |
| 2008/0202112 A1* | 8/2008 | DeMarco et al. | 60/445 |
| 2008/0294318 A1* | 11/2008 | Kuras et al. | 477/38 |
| 2008/0300103 A1* | 12/2008 | DeMarco et al. | 477/45 |

\* cited by examiner

*Primary Examiner*—Albert DeCady
*Assistant Examiner*—Steven R Garland
(74) *Attorney, Agent, or Firm*—Leydig, Voit & Mayer

(57) ABSTRACT

A system and method for controlling a variator operate to detect variator torques and/or internal pressures and generates a preliminary corrective command. The preliminary corrective command is transformed via a dynamic transform to account for system characteristics during transient operating conditions such as machine acceleration, such that the acceleration of the system during transient periods is not torque-limited by static torque-control map values. In an embodiment, the acceleration may be positive or negative, and in a further embodiment, braking is automatically applied in the case of negative requested power or desired machine retarding.

13 Claims, 7 Drawing Sheets

FEEDBACK ACCELERATION REDUCTION FOR FLUID SUPPLY VALVES

TECHNICAL FIELD

This disclosure relates generally to hydrostatic torque controlling transmissions, and, more particularly to a system for transforming variator control signals to compensate for system acceleration requirements.

BACKGROUND

Many transmission systems employ a torque controlling element to provide a continuously variable torque or speed transmission capability. An example of such a transmission is a split torque transmission, wherein a drive train is powered by dual inputs, one of which may be a torque-controlled input, such as from a hydraulic variator. In such systems, it is generally desirable to provide an output from the variator such that the resultant actual operation of the entire transmission or other system corresponds to the expected operation. For example, a user may command a certain level of acceleration, and ideally the acceleration provided by the system matches the user's needs and expectations.

To provide control signals to the variator, some systems utilize a calibration map or torque control map that maps an actuator input pressure or pressure differential to an output torque of the variator. In this way, a commanded system output may be mapped to a desired torque, which can be mapped to one or more control signals to be applied. Such a system is shown in portions of U.S. Pat. No. 6,424,902 to Kuras entitled "Method And Apparatus For Operating A Continuously Variable Transmission In The Torque Limited Region Near Zero Output Speed." Nonetheless, certain transient factors such as system acceleration can lead to a discrepancy between the expected and actual operation of the system.

The foregoing background discussion is intended solely to aid the reader. It is not intended to limit the innovations described herein nor to limit or expand the prior art discussed. Thus the foregoing discussion should not be taken to indicate that any particular element of a prior system is unsuitable for use within the innovations described herein, nor is it intended to indicate any element, including solving the motivating problem, to be essential in implementing the innovations described herein. The implementations and application of the innovations described herein are defined by the appended claims.

BRIEF SUMMARY OF THE DISCLOSURE

In one aspect, a method is provided for controlling a variator having an actuator responsive to one or more actuator pressure signals. The variator has at least one pressure sensor for detecting at least one internal hydraulic circuit pressure differential. The controller first receives an indication of a commanded internal variator pressure differential. After sensing an actual internal variator pressure differential and determining the pressure discrepancy between the commanded and actual pressure differentials, the controller extracts a first corrective control signal from a static correlation between pressure values and control values. When the controller receives an actual acceleration, it transforms the first corrective control signal as a function of the actual acceleration to yield a second corrective control signal. This second corrective control signal is provided to the variator to control its operation.

Additional and alternative features and aspects of the disclosed system and method will be appreciated from the following description.

DETAILED DESCRIPTION

This disclosure relates to an improved variator torque and acceleration control system. Using the described system, a variator is torque-controlled so that the actual output of the variator and/or associated transmission more closely matches the desired output. Torque control systems typically utilize fixed torque control signals derived from a torque control mapping and do not take into account the acceleration requirements of the affected system. The described control system transforms the torque control map values in a manner that improves the correlation between actual and expected operation of the system during acceleration. As used herein, the terms "accelerate," "acceleration," and related terms refer to a change in velocity, e.g., translational or rotational velocity, in the technical sense. Thus, for example, the term "acceleration" encompasses both positive acceleration and negative acceleration (i.e., deceleration).

Figure 1:
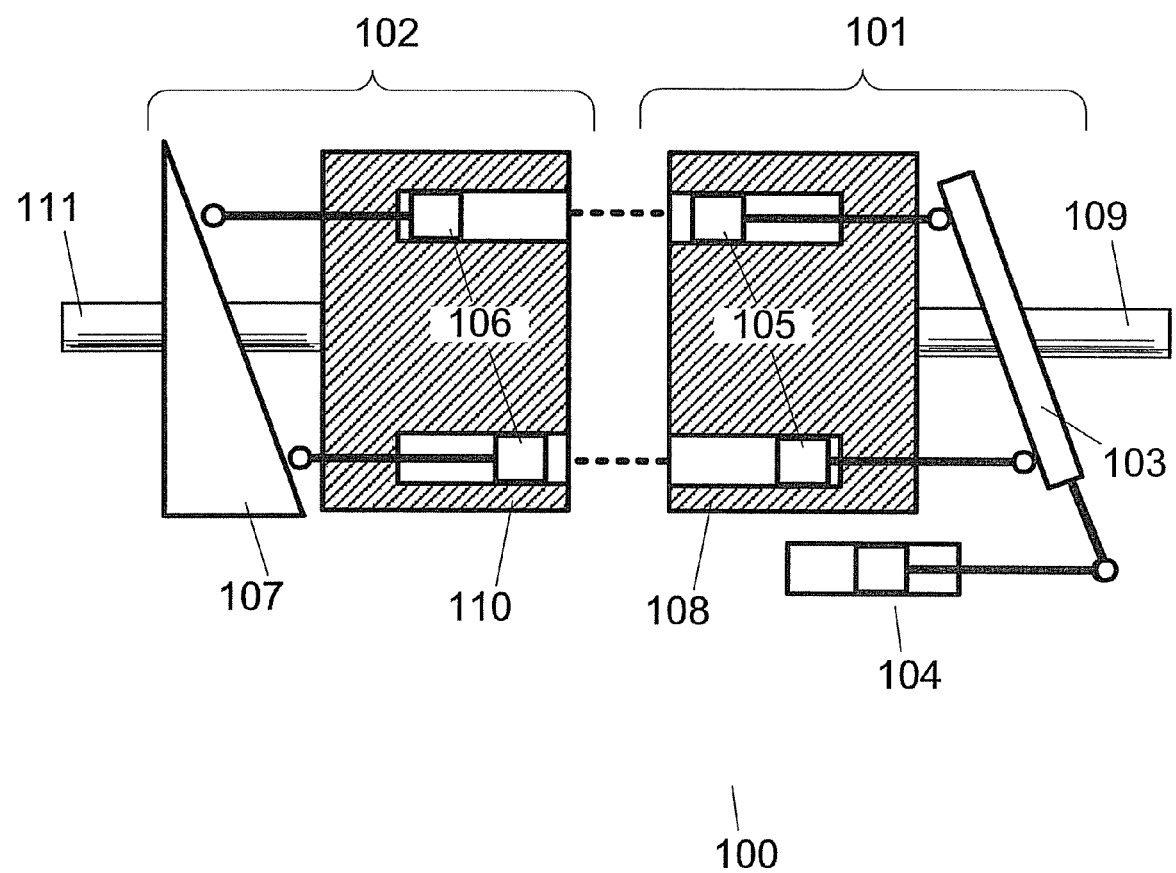
FIG. 1 is a detailed schematic drawing of a variator providing a variable output torque based on an applied control pressure differential.

FIG. 1 is a detailed schematic drawing of a variator 100 for providing a variable output torque based on an applied control pressure differential in the swash plate actuator 104. The variator 100 comprises a pump 101 and a motor 102. The pump 101 comprises a variable angle swash plate 103 set by the swash plate actuator 104. A number of pistons 105 in respective chambers ride on the swash plate 103 via sliding contacts, such that the range of movement of the pistons 105 is set by the angle of the swash plate 103. The chambers for the pistons 105 are formed in a pump carrier 108 that is rotated via the pump input shaft 109.

The motor 102 comprises a similar arrangement including a number of pistons 106 in respective chambers. The pistons 106 of the motor 102 are slidably engaged upon a fixed swash plate 107. It will be appreciated that the angle of swash plate 107 may also be variable, so as to allow a variable displacement. The chambers of the pistons 105 of the pump 101 are in fluid communication with the chambers of the pistons 106 of the motor 102 via hydraulic fluid that fills the chambers and intervening conduits (not shown). The chambers for the pistons 106 are formed in a motor carrier 110 that rotates the motor output shaft 111. As the angle of the swash plate 103 is varied, the amount of fluid displaced by the pistons 105 of the pump 101 (and thus the fluid volume received or taken from the chambers of the pistons 106) varies.

Because of these interrelationships, the motor torque varies with the net force applied to the swash plate 103 and the output speed of the motor 102 varies with the angle of swash plate 103. In overview, the swash plate actuator 104, which in this example operates on differential hydraulic pressure, is driven via solenoid valves (not shown), e.g., one for each of two pressure values, controlled electronically by appropriate input signals from a transmission controller or the like. In this way, the controller can control the torque and speed of the variator 100 via the application of electrical signals to solenoid valves associated with the swash plate actuator 104.

Figure 2:
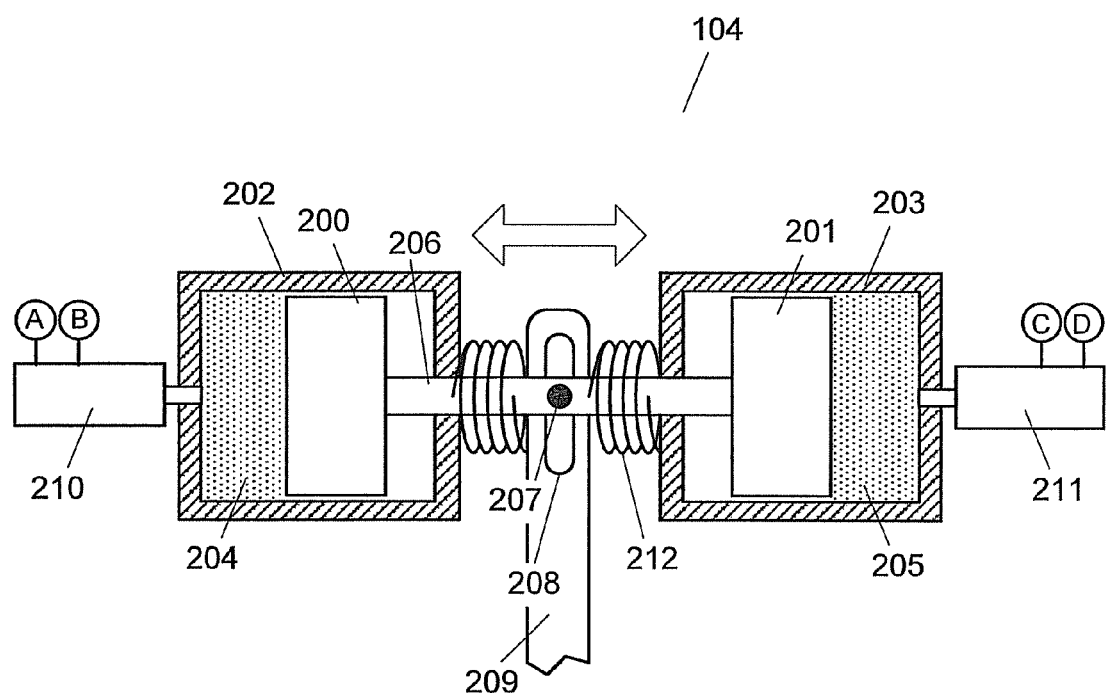
FIG. 2 is a detailed schematic drawing of a hydraulic actuator for controlling the position of a variable-angle swash plate in a variator such as that shown in FIG. 1.

FIG. 2 is a detailed schematic drawing of a hydraulic actuator 104 for controlling the actuation force on the variable-angle swash plate 103 in a variator 100 such as that shown in FIG. 1. The actuator 104 includes a number of interrelated elements including primarily two opposed pistons 200, 201, within respective cylinders 202, 203. The pistons 200, 201 cooperate with the bores of their respective cylinders 202, 203 to form respective pressure chambers 204, 205 for containing pressurized hydraulic fluid.

The pistons 200, 201 are joined by a bar 206 which has a central pivot pin 207 mounted thereon. The central pivot pin 207 interferes within a slot 208 in a swash plate arm 209, such that the lateral position of the bar 206 establishes the position of the swash plate arm 209 and hence the angle of the swash plate 103 itself. The bar 206 is biased to a central position by opposing springs 212. As the bar 206 is displaced from this central position, there is a restoring force exerted by springs 212 that is proportional to the displacement.

The lateral position, velocity, and acceleration of the bar 206 is determined by the sum of the forces acting on the pistons 200, 201. The forces acting on the pistons 200, 201 are derived from the following sources: (1) pressures in chambers 204 and 205, (2) forces from the spring 212, which are a function of displacement of pistons 200, 201, and (3) swivel forces acting through the swash plate which are a function of torque, pump speed, motor speed, etc. Respective pressure valves 210, 211 independently control the pressure within chambers 204, 205. In an example, the pressure valves 210, 211 are solenoid valves (current-controlled variable pressure valves) that supply hydraulic fluid at a pressure that is set by an applied current within limits set by a supply pressure. Thus, in the illustrated example, each valve 210, 211 has at least a current input (illustrated as inputs A and C) and a fluid input (illustrated as inputs B and D). Typically, solenoid valves can supply fluid at any pressure between zero and the fluid pressure at the fluid input B, D.

Considering FIG. 2 in conjunction with FIG. 1, it will be appreciated that the torque supplied at output 111 is directly related to the pressure differential applied by valves 210, 211. In particular, the fluid pressure within the hydraulic circuit is related to the pressure differential applied by valves 210, 211. Thus, in torque-controlled applications, it is desirable to accurately correlate combinations of solenoid currents for valves 210 and 211 (or applied pressure differential in actuator 104) with expected associated output torques at output 111.

Figure 3:
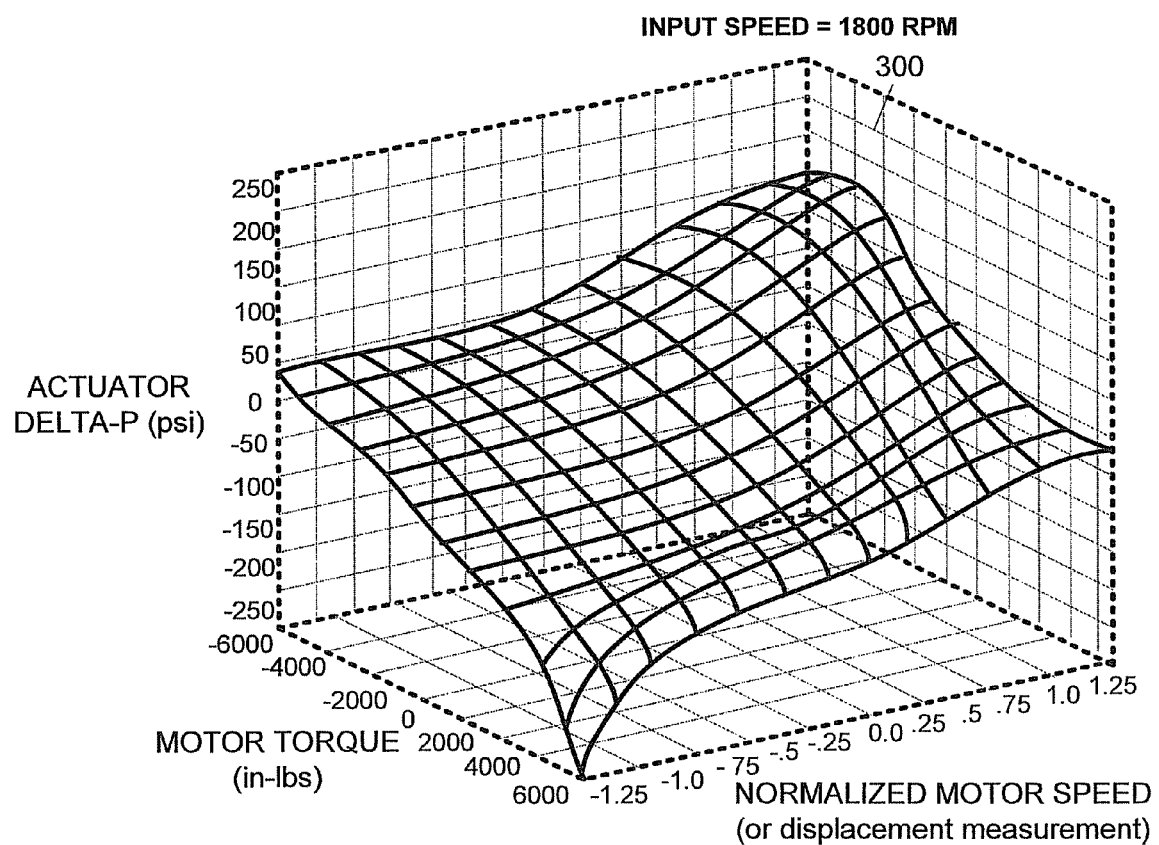
FIG. 3 is a three-dimensional section of a four dimensional map correlating actuator pressure differentials, variator input speeds and variator output speeds with expected output torques at a variator input speed of 1800 RPM.

As a first step, a predetermined map is used to correlate specific pressure differentials with specific expected output torques. In practice, the relationship between these values also depends upon the following: (1) pump displacement of piston 104 (measured directly via a displacement sensor, or calculated by motor speed/pump speed, e.g., via normalized motor speed), and (2) input (pump) speed. Thus, a 4-dimensional mapping is used to correlate the various values. FIG. 3 illustrates such a map with the dimension of variator input speed set at 1800 RPM. Thus, the illustrated surface 300 correlates expected output torque (left horizontal axis) with a combination of the applied pressure differential in the actuator 104 (vertical axis) and the known variator normalized motor speed or displacement (right horizontal axis, normalized). Different absolute variator input speeds would result in different 3-dimensional surfaces relating the remaining variables.

Figure 4:
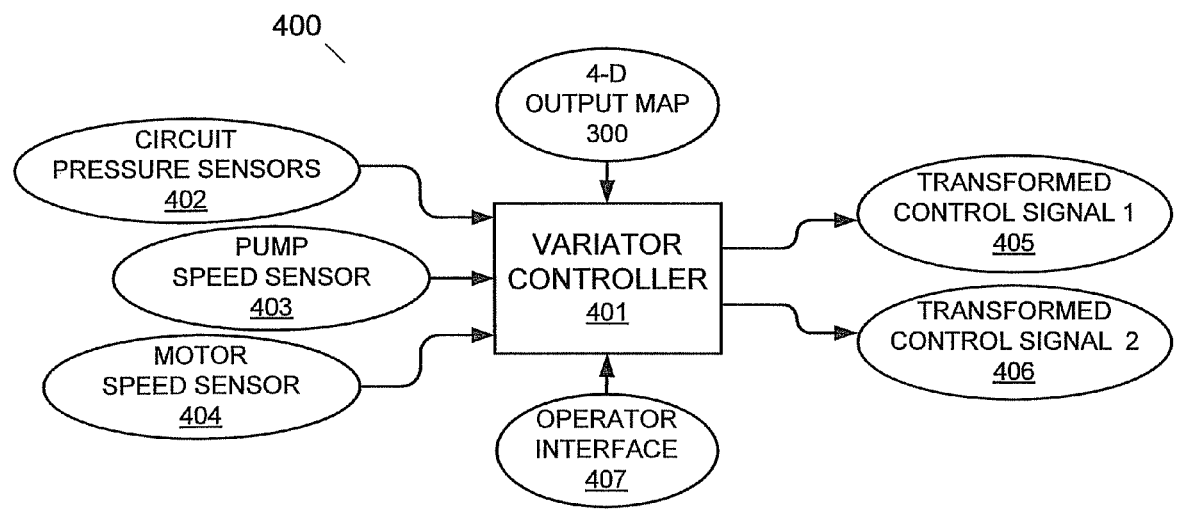
FIG. 4 is a simplified logical schematic of control components and data flow associated with an actuator to effectively control a variator.

Before discussing the variator control process in detail, the control infrastructure and informational flow within the system will be discussed. FIG. 4 is a simplified logical schematic 400 of the control components and data flow associated with the mechanical components of FIG. 2 to effectively control the operation of the variator 100. In overview, a variator controller 401 directs the operation of the variator 100 via solenoid valves 210 and 211. The variator controller 401 may be a dedicated variator controller, but more typically will also control a larger system, such as a transmission, associated with the variator 100. The controller 401 may be of any suitable construction, however in one example it comprises a digital processor system including a microprocessor circuit having data inputs and control outputs, operating in accordance with computer-readable instructions stored on a computer-readable medium. Typically, the processor will have associated therewith long-term (non-volatile) memory for storing the program instructions, as well as short-term (volatile) memory for storing operands and results during (or resulting from) processing.

In operation, the controller 401 receives a number of data inputs from the variator system 100 and provides a number of control outputs to the system 100. In particular, the controller 401 has a first data input connected to circuit pressure sensors 402. Although it is possible to use a single pressure sensor, it is desirable to use multiple sensors to obtain more accurate pressure readings. The circuit pressure sensors 402 are positioned and adapted to sense the hydraulic pressure within the internal hydraulic circuit of the variator 100 (i.e., between pistons 105 and 106) and to provide signals related to the sensed pressures.

A second data input to the controller 401 is linked to a pump speed sensor 403. The pump speed sensor 403 is positioned and adapted to detect the rotational speed of the variator input shaft 109 and to provide a signal related to the sensed rotational input speed. A motor speed sensor 404 is linked to a third data input of the controller 401. The motor speed sensor 404 is positioned and adapted to detect the rotational speed of the variator output shaft 111 and to provide a signal related to the sensed rotational output speed. It will be appreciated that the pump displacement (e.g., derived from the stroke of actuator 104) or the angle of the swash plate 103 (e.g., derived from an angle sensor) can be used as an input in place of the normalized motor speed.

In order to detect a desired torque, the controller 401 also receives a data input from the operator interface 407, e.g., an accelerator setting. The operator may be human or automated, and the operator interface may vary accordingly. The variator controller 401 also reads the 4-D output map 300 discussed with reference to FIG. 3. It will be appreciated that there are typically a plurality of different torque control maps available for use, and that the appropriate map for use at any particular time will be selected as needed, such as by selecting a map correlated with a particular variator input speed etc. Moreover, it will be appreciated that values may be retrieved from multiple maps and interpolated to derive a needed actuator pressure differential when operating at an RPM for which no map is available.

Based on the various available inputs as discussed above, the controller 401 calculates and provides appropriate control signals to the actuator 104 such that the variator output torque more closely corresponds to the desired output torque. In particular, the controller 401 provides two solenoid control signals 405, 406 to control the operation of the actuator 104 and thus the operation of the variator 100. The solenoid control signals 405, 406 include a first solenoid control signal 405 to control a first one 210 of the actuator pressure valves and a second solenoid control signal 406 to control a second one 211 of the actuator pressure valves.

However, when using a static torque control map, the variator output torque and system acceleration can diverge substantially from the desired operation, regardless of whether closed loop or open loop control is used. In particular, the values provided by torque control maps are typically derived for static conditions rather than transient conditions which result in typical valve pressure drop when the system is accelerating or decelerating. Referring to FIGS. 1 and 2, since hydraulic fluid is essentially noncompressible, when the flow rate of hydraulic fluid into and out of the chambers 204, 205 of the actuator 104 is zero, the angular velocity of the swash plate 103 is also zero. In this condition, the motor acceleration is also zero or insubstantial unless the load is changing. In this condition, there is no pressure drop in the valve when there is no flow, and thus actuator pressures 204, 205 are accurate and produce the desired motor torque and/or output torque. However, during an acceleration, the valves 210, 211 experience a pressure drop due to flow and thus the actuator pressures 204, 205 are not accurate, resulting in the system's inability to produce the desired torque.

In an embodiment, a dynamic transformation is applied to adjust the values provided by the map to account for actual acceleration or valve pressure drop due to flow such that the actual torque output of the variator 100 more closely matches the desired torque. In particular, based on the various available inputs as discussed above, the controller 401 provides one or more transformed solenoid control signals 405, 406 to control the operation of the actuator 103 and thus the operation of the variator 100 during periods of actual acceleration. In an example where a single solenoid drives the actuator 104, the controller 401 provides a single transformed solenoid control signal, whereas in the illustrated arrangement which uses two solenoids 210, 211 to drive the actuator 104, the controller 401 provides a first transformed solenoid control signal 405 to control a first one 210 of the actuator pressure valves and a second transformed solenoid control signal 406 to control a second one 211 of the actuator pressure valves.

Figure 5:
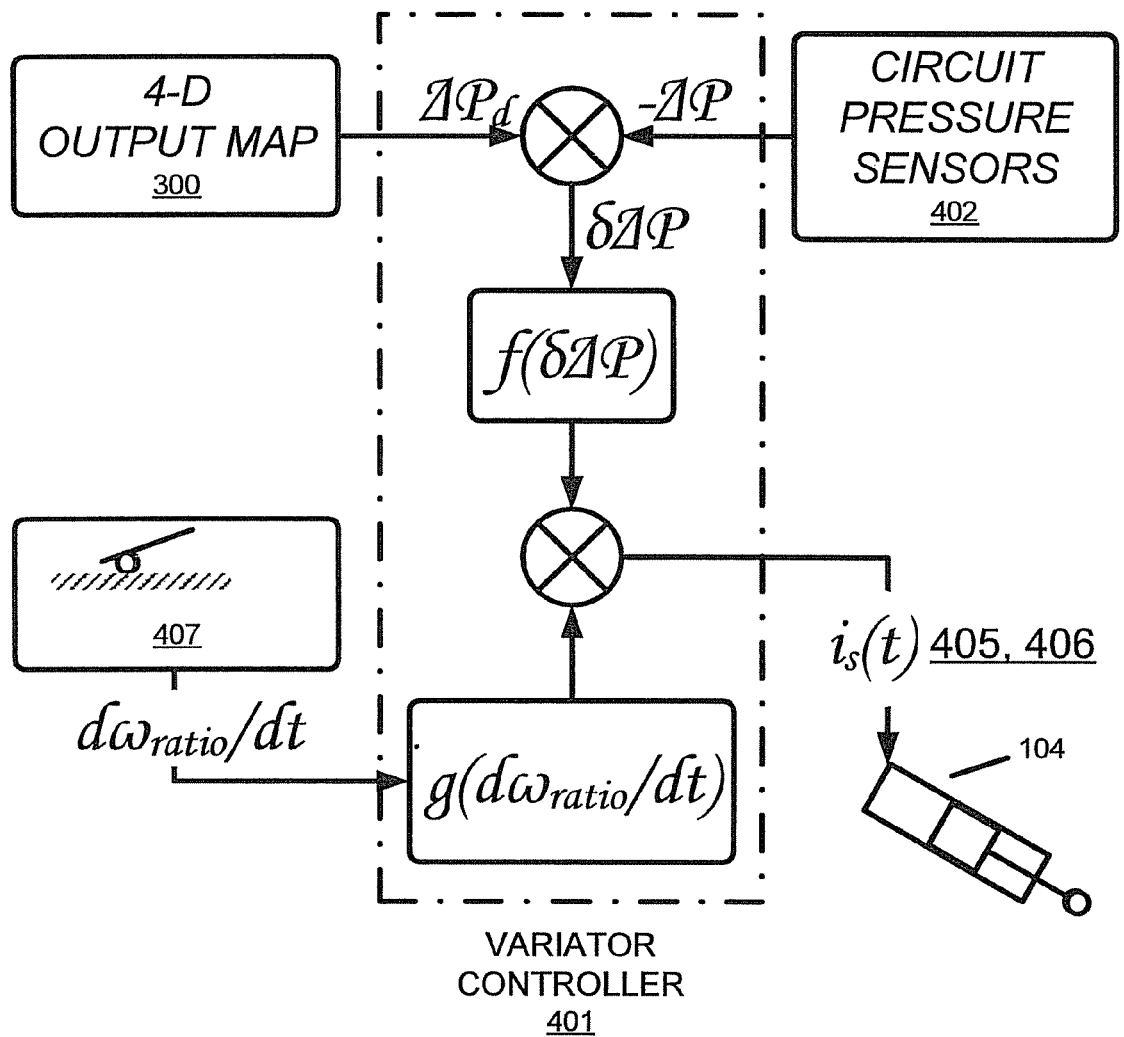
FIG. 5 is a logical diagram of certain inputs, outputs, and process logic of a variator controller with respect to the production of actuator control signals.

FIG. 5 is a logical diagram 500 of the input, output, and process logic of the variator controller 401 with respect to the production of actuator control signals. The controller 401 receives from the map 300 a pressure differential value $\Delta P_d$ corresponding to a desired or commanded torque. In addition, the controller 401 receives a pressure difference signal $\Delta P$ (or signals from which a pressure differential can be derived) from circuit pressure sensors 402. The pressure differential value $\Delta P_d$ and pressure difference signal $\Delta P$ are differenced to yield a pressure correction value $\delta\Delta P$. Although a function $f(\delta\Delta P)$ of this pressure correction value could be applied to the solenoid valves to control the actuator 104, this can yield undesirable or suboptimal results under transient circumstances as noted above.

In the illustrated embodiment, the signal $f(\delta\Delta P)$ is transformed to diminish the effects of the transience of the current state of the variator. For example, the variator controller 401 receives an actual acceleration signal $d\omega_{ratio}/dt$ (derivative of actual motor speed ratio $\omega_{ratio}$ (motor speed 404 divided by pump speed 403)). Under conditions of positive actual acceleration, the signal $f(\delta\Delta P)$ is transformed as a function of the actual acceleration $d\omega_{ratio}/dt$ to provide a valve adjustment during the transient period, e.g., the period of acceleration. In the illustrated example, a function $g(d\omega_{ratio}/dt)$ of the actual angular acceleration is applied to additively transform the function $f(\delta\Delta P)$ of the pressure correction value to yield a desired solenoid current or currents as $i_s(t)=f(\delta\Delta P)+g(d\omega_{ratio}/dt)$. In the case of a two-solenoid controlled actuator 104, the resultant signal $i_s(t)$ comprises two current values that are applied to the solenoid valves 210, 211 as transformed control signals 405, 406 to provide the requested torque.

In an alternative embodiment, the system 400 includes a displacement sensor and the derivative of the resultant signal is used instead of $d\omega_{ratio}/dt$. With this, system response may be improved in some cases since the process would have access to actual actuator information.

In a similar manner, when deceleration is requested, the appropriate pressure differential determined by a torque control map will typically not yield the required deceleration. In this case, the function $g(d\omega_{mratio}/dt)$ preferably has a negative value such that the additive transformation of $f(\delta\Delta P)$ via $g(d\omega_{mratio}/dt)$ results in a decrease in the value of $f(\delta\Delta P)$. In this manner, the actual retarding torque will more closely match the requested torque. In a further embodiment, automatic braking may be used in addition to or in lieu of the described control signal transformation to allow the system to slow at the requested rate.

Although the values and configurations of the various functions described with respect to FIG. 5 will depend upon the operating environment and designer preferences, in an embodiment, the functions are linear functions. Thus, $f(\delta\Delta P)$ may be of the form $f(\delta\Delta P)=A\cdot(\Delta P_d-\Delta P)+B$. Similarly, the function $g(d\omega_{mratio}/dt)$ may be of the form $g(d\omega_{mratio}/dt)=C\cdot(d\omega_{mratio}/dt)$. In an illustrative embodiment, the values A, B, and C, are empirically determined. For example, (A; B; C) may be set to (0.4; 0; 0.3). The illustrated functions may also be functions of other variables. For example, the function $g(d\omega_{mratio}/dt)$ may also include parameters related to variator input and/or output speed, such that a greater correction is applied at higher speeds.

Figure 6:
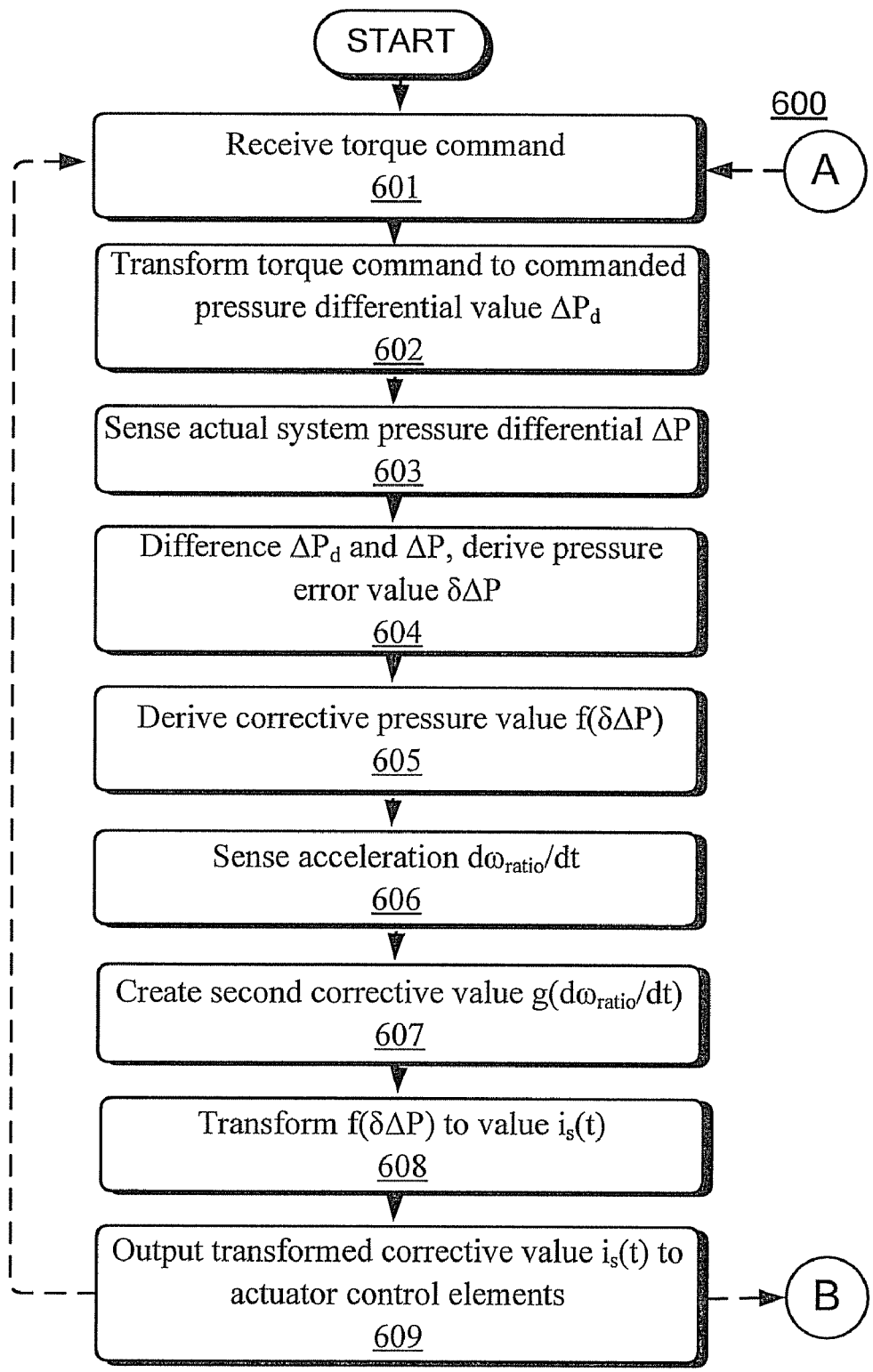
FIG. 6 is a flowchart illustrating a process for producing transformed variator control signals based on actual acceleration, desired torque, and actual torque according to an illustrative embodiment.

FIG. 6 is a flowchart 600 illustrating a process for producing transformed variator control signals 405, 406 based on an acceleration, a desired torque, and an actual torque according to an embodiment. At stage 601 of the process 600, the variator controller 401 receives a torque command, e.g., from the operator interface 407 or from internal calculations based on sensed system conditions. At stage 602, the variator controller 401 transforms the torque command to a commanded pressure differential value $\Delta P_d$ via torque control map 300. The actual system pressure differential $\Delta P$ is sensed in stage 603 via sensors 402.

At stage 604, the controller 401 differences the commanded pressure differential value $\Delta P_d$ and actual system pressure differential $\Delta P$ to derive a pressure error value $\delta\Delta P$. The pressure error value $\delta\Delta P$ is used in stage 605 to derive a first corrective pressure value $f(\delta\Delta P)$, e.g., a set of currents normally applied to actuator control solenoids 210, 211 to minimize the difference between the actual $\Delta P$ and commanded $\Delta P_d$ pressure differentials. At stage 606, the controller 401 senses an acceleration $d\omega_{ratio}/dt$. It should be noted that the acceleration $d\omega_{ratio}/dt$ may be positive, negative, or zero.

The acceleration $d\omega_{ratio}/dt$ is processed in stage 607 to produce a second corrective value $g(d\omega_{ratio}/dt)$, which is used in stage 608 to transform the first corrective pressure value $f(\delta\Delta P)$ into a transformed corrective value $i_s(t)$. As noted above, the first $f(\delta\Delta P)$ and second $g(d\omega_{ratio}/dt)$ corrective values may be derived via linear and/or additive transformations of the input parameters; however, more complex transformations such as scaling or nonlinear transformations may alternatively be used depending upon producer or operator preferences. At stage 609, the controller 401 outputs the transformed corrective value to one or more actuator control elements, e.g., solenoids 210, 211, to control the variator 100.

Figure 7:
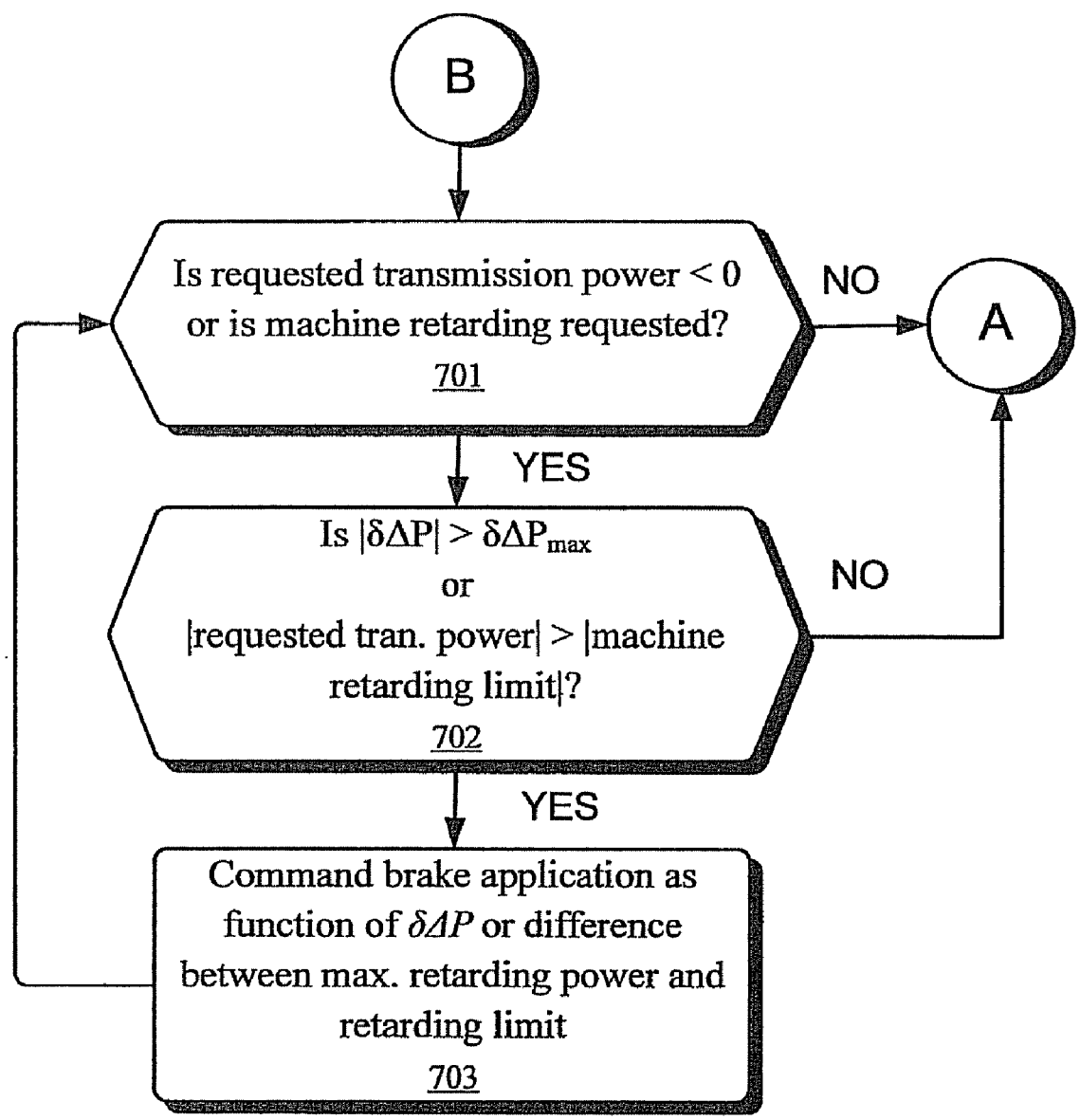
FIG. 7 is a flowchart illustrating an example process for automatically applying system brakes.

After stage 609, the variator controller 401 optionally follows link B to apply system brakes to slow the machine if the requested transmission retarding power is greater than a machine retarding limit (engine braking capability, implement parasitics, etc., including other known retarding devices and affects) or retarding torque error $\delta\Delta P$, is greater than a predefined threshold. The flow chart 700 of FIG. 7 illustrates in greater detail an example process for automatically applying system brakes. Starting at link B and proceeding to stage 701, the controller 401 determines whether the requested transmission retarding power is not negative, and if so, the process 700 exits via link A. Otherwise, in an embodiment the controller further determines at stage 702 whether the pressure error value $\delta\Delta P$ has an absolute magnitude greater than a predetermined threshold value $\delta\Delta P_{max}$ or the requested retarding power is greater than the retarding limit. If stage 702 is satisfied, the controller 401 commands an application of system brakes in stage 703, e.g., via operator interface or otherwise, to more quickly slow the machine. The application of system brakes may be constant or may be a function of the maximum value between the error value $\delta\Delta P$ or the difference between maximum retarding power and the retarding limit. In an embodiment, the applied braking pressure is proportional to the magnitude of the maximum value between the error value $\delta\Delta P$ or the difference between maximum retarding power and the retarding limit. After execution of stage 703, the process 700 returns to stage 701, and in successive computing intervals, stages 701, 702, and 703 are repeated while the conditions for application are met. It will be appreciated that the steps of processes 600 and 700 may be executed in parallel once process 700 is triggered.

Although this description is primarily focused on a system incorporating the described innovations, it will be appreciated that the described techniques are applicable to existing transmissions and controllers as well. For example, an existing transmission may be upgraded by inputting the computer-executable instructions according to all or portions of the processes 600 and 700 as needed into a computer-readable memory of an existing transmission controller without actually adding or removing any hardware to or from the system.

INDUSTRIAL APPLICABILITY

The industrial applicability of the variator control system described herein will be readily appreciated from the foregoing discussion. A technique is described wherein a variator output is controlled so that the actual output of the variator closely matches the desired output under transient conditions. Predetermined torque control mappings provide static values that do not account for the dynamic variations of the transmission system such as during acceleration. The described control system transforms actuator control signals derived from map values according to a dynamic transformation to improve the correlation between the expected and actual operation of the variator. In an example, the dynamic transformation is configured to compensate for acceleration conditions.

Examples of the present disclosure are applicable to any system employing a hydraulic variator wherein it is desired that the operation of the variator based on static torque control mappings conforms to the expected output torque and acceleration under actual operating conditions. For example, many transmission systems, especially for heavy industrial machines, use components such as continuously variable transmissions that employ a variator and that thus may benefit from application of the teachings herein. In such machines, application of the foregoing teachings can provide better shift performance and an improved user experience due to more precise control and better acceleration at the transmission input (i.e., the variator output). Thus, for example, a heavy industrial machine employing such a transmission may be operated under variable acceleration commands without experiencing lagging acceleration or oddities in shift behavior. In this way, although a static variator torque-control map may be inaccurate across different usage scenarios, the operation of the associated transmission may nonetheless be maintained through use of the present system.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method of controlling a variator having an actuator responsive to one or more actuator pressure signals, the variator including one or more pressure sensors for detecting one or more respective internal hydraulic circuit pressures representing an internal pressure differential, the method comprising: receiving an indication of a commanded internal variator pressure differential; sensing an actual internal variator pressure differential and determining a pressure discrepancy between the commanded internal variator pressure differential and the actual internal variator pressure differential; extracting a first corrective control signal based on a predetermined association of multiple pressure values to multiple respective control values, whereby the predetermined association relates the pressure discrepancy to the first corrective control signal; sensing an acceleration and transforming the first corrective control signal as a function of the acceleration to yield a second corrective control signal; and providing the second corrective control signal to the variator to control the operation of the variator.

2. The method according to claim 1, wherein the variator actuator is a hydraulic actuator including at least one solenoid valve for hydraulic control, and wherein the second corrective control signal includes at least one electronic current signal, wherein the step of providing the second corrective control signal to the variator to control the operation of the variator includes providing the at least one electronic current signal to the at least one solenoid valve.

3. The method according to claim 1, wherein the step of receiving a commanded internal variator pressure differential includes receiving an acceleration indication from an operator interface.

4. The method according to claim 1, wherein the step of sensing an acceleration includes sensing an internal system pressure.

5. The method according to claim 1, wherein the first and second corrective control signals each include two electronic current signals.

6. The method according to claim 1, wherein the predetermined association of multiple pressure values to multiple respective control values includes one of a plurality 3-dimensional torque control maps.

7. The method according to claim 1, further including: determining that the commanded internal variator pressure differential indicates that machine retarding is desired; and applying a brake to contribute to a machine deceleration.

8. The method according to claim 7, wherein applying the brake further includes: determining that the pressure discrepancy exceeds a predetermined threshold; and responsive to the determination that the pressure discrepancy exceeds the predetermined threshold, applying the brake.

9. The method according to claim 1, wherein transforming the first corrective control signal as a function of the acceleration includes adding an offset value to the first corrective control signal, wherein the offset value is a function of the acceleration.

10. A computer-readable medium having thereon computer-executable code for executing a method of controlling a variator having an actuator responsive to an actuator signal, the computer-executable code comprising instructions for: detecting a commanded variator pressure differential; detecting a current variator pressure differential and determining a discrepancy between the commanded variator pressure differential and the current variator pressure differential; generating a preliminary corrective control signal corresponding to the determined discrepancy based on a map relating pressure values to respective control values; receiving an acceleration command; transforming the preliminary corrective control signal as a function of the acceleration command to yield a final corrective control signal; and providing the final corrective control signal to the variator.

11. The computer-readable medium according to claim 10, wherein the variator actuator is a hydraulic actuator including at least one electronically-actuated valve for hydraulic control, and wherein the final corrective control signal includes at least one electronic signal, wherein the instructions for providing the final corrective control signal to the variator include instructions for providing the at least one electronic signal to the at least one electronically-actuated valve.

12. The computer-readable medium according to claim 10, wherein the instructions for detecting a commanded variator pressure differential include instructions for receiving an indication of the commanded variator pressure differential from an operator interface.

13. The computer-readable medium according to claim 10, wherein the computer-executable code further includes instructions for: determining that a requested power is negative or that machine retarding is desired; and applying a brake to increase a magnitude of deceleration of a machine associated with the variator.

* * * * *